Figure 1:
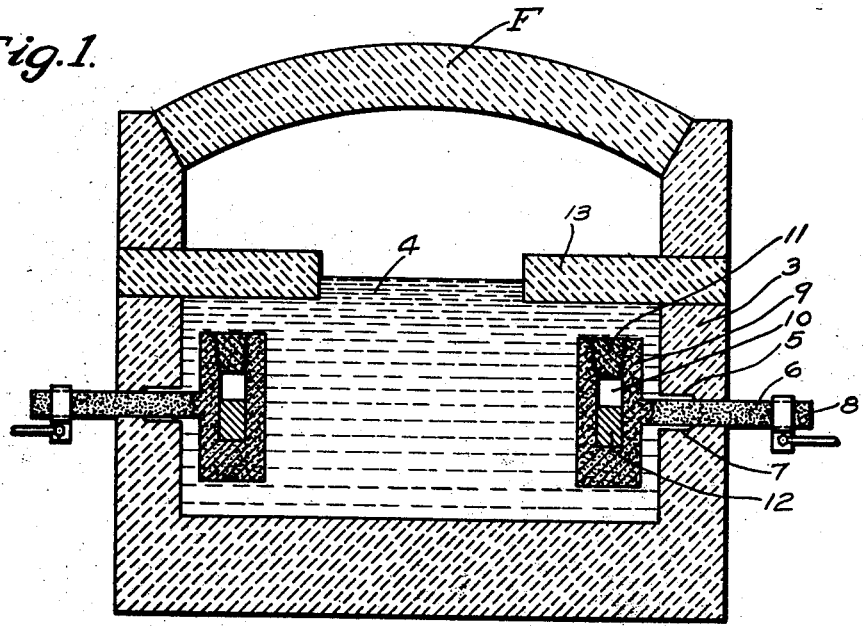

Inventor;
Harold A. Wadman

Patented Oct. 4, 1932

1,880,540

UNITED STATES PATENT OFFICE

HAROLD A. WADMAN, OF HARTFORD, CONNECTICUT, ASSIGNOR TO HARTFORD-EMPIRE COMPANY, OF HARTFORD, CONNECTICUT, A CORPORATION OF DELAWARE

ELECTRODE FOR GLASS MELTING FURNACES

Application filed March 1, 1930. Serial No. 432,371.

This invention relates to a furnace for the melting of glass by electricity, and more particularly relates to a new type of electrode for such a furnace.

The principal difficulty in the melting of glass in which the glass itself acts as a resistance to an electric current is that no perfectly satisfactory electrode which may be completely submerged in the glass has heretofore been found. Electrodes made of metal of sufficiently low cost to be economically feasible cannot be used in the melting of glass because they rapidly deteriorate in the presence of glass at the high temperatures which are necessary to melt the glass unless artificially cooled. Graphite electrodes, as far as is known, are the only type which are economically feasible and can be used in molten glass without cooling of the electrode or discoloration of the glass. There are two inherent difficulties in the use of electrodes of this type. One is that unless they are maintained out of contact with the atmosphere at temperatures approaching that of molten glass they rapidly become oxidized and deteriorate, and the second is the inherent fragility of the material. In the use of electrodes of this type, they must not only be totally submerged in the glass, but they must be maintained to a large extent out of contact with the side walls of the melting furnace as a certain amount of air leaks through or around the refractories and oxidizes them. It has, therefore, been proposed to form electrodes of graphite somewhat in the shape of a T, that is, with a comparatively large glass contacting surface or head to which is attached a stem which projects through the wall of the furnace and which holds the larger part of the electrode in place in the furnace and out of contact with the wall. However, due to the fragility of the graphite and the lesser specific gravity thereof relative to that of glass, the electrodes have a tendency to float and exert a stress upon the stem, which is sometimes constant and sometimes fluctuating, according to whether or not the input of batch is constant or fluctuating. This often causes the head of the electrode to break off from the stem or causes the stem to break between the head and the side of the furnace. Heretofore the portions of the electrode which have broken off have floated to the surface, come in contact with the air, oxidized and discolored the glass, rendering it unfit for use.

The present invention comprises generally the use of a graphite electrode which is in itself of lesser specific gravity than glass, but which has been weighted to exceed the specific gravity of glass.

An object of my invention therefore, is to provide an electrode adapted for submergence in a bath of molten glass, the external portions of which are formed of graphite or similar material of lesser specific gravity than the glass and which will not contaminate the glass, said electrode being internally weighted to increase the effective average specific gravity of the whole electrode to a point above the specific gravity of the glass in order to lessen the strains upon the mounting of the electrode and/or to prevent an unanchored electrode from rising to the surface of the glass.

Figure 2:
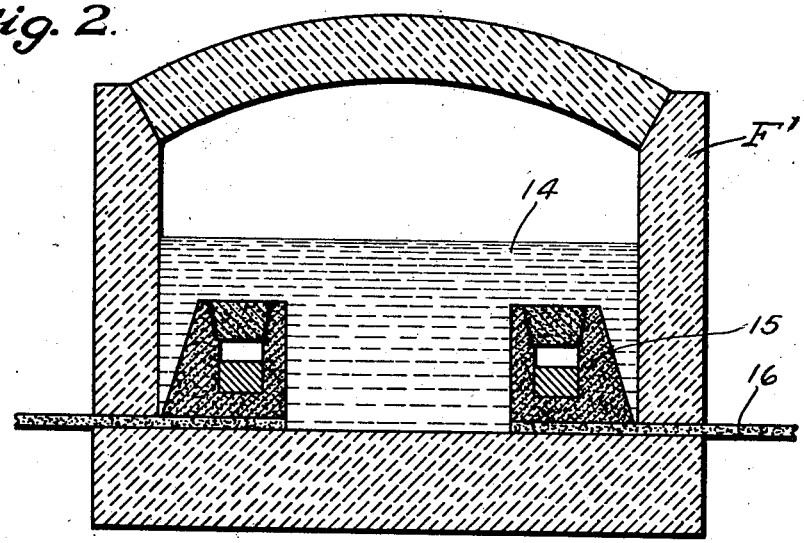

Further objects will appear from the specification and drawing, in which:

Figure 1 is a transverse vertical section of an electric glass melting furnace showing my invention; and Fig. 2 is a similar view of another embodiment thereof.

The preferred embodiment of my invention is shown in Fig. 1 in which a glass melting tank is designated as F. The tank may be built of any preferred material and form suitable for such purposes, such material being of a refractory nature. The tank herein shown comprises side walls 3 within which is a bath of molten glass 4. Through apertures 5 in the sides of the furnace or tank extend electrodes 6. Each of the apertures 5 is preferably of two diameters, the smaller diameter being in the outer part of the wall and adapted to fit the portion of the electrode going therethrough. The larger diameter 7 is in the inner portion of the wall and is adapted to receive a small portion of the molten glass which enters the hole and freezes therein about the electrode and precludes the admission of air to the tank through the aperture.

The electrode itself is composed of graphite and is formed in the shape of a T having a stem 8 which extends through the walls of the furnace and a head 9 which may be of any preferred shape, but in which is a cavity 10 which is sealed by a plug 11 also of graphite. The electrode, being of graphite, is of a lesser specific gravity than that of molten glass and the cavity 10 is adapted to receive a material of greater specific gravity than the glass in order to increase the total weight of the electrode as a whole and cause its average or effective specific gravity to exceed the specific gravity of the surrounding glass. The material, designated as 12, may be of any substance having a high specific gravity and not liable to extreme expansions at the high temperature of molten glass. It should preferably be an electric conductor, and among the many substances suited for this purpose iron or lead are the most common. It is obvious that the graphite protects the metal from the attacks of the glass and, conversely, the glass from discoloration by the metal. In this embodiment of my invention, the specific gravity of the electrode and content should be only slightly higher than that of the glass so that it will not exert a strong downward stress on the stem but still be sufficient to sink the head of the electrode should it break off.

Were it not for this increase in the specific gravity of the electrode, its tendency to float coupled with the action of the glass as fresh batch is introduced or as the glass is withdrawn would cause a variable upwardly directed force upon the electrode itself tending to cause it to break at its thinner section. It is necessary to maintain the electrode out of contact with the refractory wall 3 for the reason that a certain amount of air enters through the side walls. If the electrode were in contact with the walls, oxidation of the electrode would occur, and hence disintegration of the electrode would occur and an undesired color would be imparted to the glass.

A shelf 13 extends from the wall 3 above the electrode and protects it from strains which might be imposed upon it were glass making batch dropped directly into the furnace and above it. It also prevents the unmelted glass batch, which floats as an ice-berg in the tank, from hitting the electrode.

A second embodiment of my invention is shown in Fig. 2, and is essentially similar to that shown in Fig. 1. It is designed, however, for use in cases in which either the absolute clarity of the glass is unimportant, or where the structure of the bottom of the furnace may be such as to greatly minimize the admission of air therethrough. As shown in Fig. 2, in the glass melting tank F' is a bath of glass 14 in which are situated electrodes 15. The electrodes 15 are essentially similar to those shown in Fig. 1, but the cavity therein is larger and these electrodes contain a proportionately larger amount of heavy metal so that the electrodes are maintained by their increased weight in a position upon the bottom of the furnace on carbon or graphite plates 16 which extend through the walls of the furnace and rest on the bottom thereof. Thus there is no tendency for the electrodes to break. Optionally the plates 16 may be supported above the bottom of the furnace on refractory bricks similar to those forming the walls of the furnace, and thus a still greater portion thereof will be maintained out of contact with the floor proper.

The greatest leakage of air into the furnace through a refractory occurs through the side walls, and it is to be noted that the electrodes shown in this embodiment of my invention are maintained entirely out of contact therewith. In the construction in the furnace proper it is possible to place the bottom of the furnace on a plate of iron or other metal and thus greatly minimize the amount of air entering therethrough.

When this embodiment of my invention is used, it is not necessary to provide the refractory shelf 13 shown in Fig. 1, as the electrodes are maintained at a depth below that to which the unmelted glass batch or cullet will sink.

It is obvious that many changes may be made in the application of the above described invention without departing from the spirit and scope thereof as set out in the following claims.

For my invention I claim:

1. The combination with an electric glass melting furnace of an electrode having an outer glass contacting portion of a material which is lighter than the glass and an inner portion having specific gravity higher than the glass.

2. The combination with an electric glass melting furnace wherein the glass acts as the conductor of a submerged electrode, said electrode comprising an outer layer of graphite and an inner portion of a heavy material, the bulk specific gravity of the electrode being at least equal to the specific gravity of the glass.

3. The combination with an electric glass melting furnace in which the glass acts as a resistor of a composite electrode submerged in the glass having an inner heavy portion and an outer and glass contacting lighter portion, said last named portion of a material adapted to withstand melting temperatures of the glass without deterioration and without discoloring the glass.

4. A glass melting furnace comprising electrodes normally submerged in molten glass and a shelf out of contact with said electrodes to protect the electrodes from the application to their upper surfaces of weight other than that of molten glass.

5. An electric furnace for making glass comprising walls, shelves extending from said walls, and electrodes beneath said shelves but out of contact therewith.

6. An electric glass melting furnace comprising walls, shelves extending from said walls at the normal glass level of said furnace, and electrodes mounted beneath said shelves but out of contact therewith.

7. In combination with a glass melting furnace a hollow graphite electrode loaded with a glass contaminating substance of greater specific gravity than that of molten glass.

8. In combination, in a glass melting furnace, electrodes comprising a head portion and a stem portion, a cavity in said head portion, a metallic glass contaminating substance of greater specific gravity than that of molten glass in said cavity, and a plug for maintaining molten glass out of contact with the metallic substance in said head portion of the electrode.

9. In a furnace for making glass in which the glass acts as the resistance to an electric current, an electrode submerged in the glass and supported out of contact with the bottom of the furnace and having an average specific gravity but slightly greater than that of the glass.

10. The combination with an electric glass making furnace in which the glass acts as a resistor to a current of electricity, of an electrode submerged in the glass having a glass contacting surface adapted to withstand melting temperatures of the glass without deterioration and without discoloring the glass, and having an inner portion of such specific gravity that the bulk specific gravity of the electrode will be as great as the specific gravity of the glass.

Signed at Hartford, Connecticut this 25th day of February 1930.

HAROLD A. WADMAN.